(12) United States Patent
Hart (10) Patent No.: US 12,270,429 B2
(45) Date of Patent: Apr. 8, 2025

(54) RAFTER HANGER

(71) Applicant: Keir Hart, Lafayette, CO (US)

(72) Inventor: Keir Hart, Lafayette, CO (US)

(*) Notice: Subject to any disclaimer, the term of this patent is extended or adjusted under 35 U.S.C. 154(b) by 0 days.

(21) Appl. No.: 18/628,740

(22) Filed: Apr. 7, 2024

(65) Prior Publication Data

US 2024/0247681 A1 Jul. 25, 2024

Related U.S. Application Data

(63) Continuation of application No. 18/095,623, filed on Jan. 11, 2023, now Pat. No. 11,953,048.

(51) Int. Cl.
*F16B 45/00* (2006.01)
*F16M 13/02* (2006.01)

(52) U.S. Cl.
CPC ............ *F16B 45/00* (2013.01); *F16M 13/022* (2013.01)

(58) Field of Classification Search
CPC .............................. F16M 13/022; F16B 45/00
USPC ......................................................... 248/215
See application file for complete search history.

(56) References Cited

U.S. PATENT DOCUMENTS

| | | | | |
|---|---|---|---|---|
| 141,498 A * | 8/1873 | Edmonston | ............ | A47B 57/56 248/217.1 |
| 2,582,650 A * | 1/1952 | Patton | ....................... | B60R 7/10 224/275 |
| 2,606,734 A * | 8/1952 | Magnuson | ......... | A47G 25/0678 248/301 |
| 2,869,812 A * | 1/1959 | Hamel | ................... | B63H 16/06 114/364 |
| 3,204,908 A * | 9/1965 | Brown | ................... | A01K 97/00 248/228.6 |
| D279,450 S * | 7/1985 | Chap | .............................. | D8/367 |
| D281,575 S * | 12/1985 | Chap | .............................. | D8/367 |
| 5,014,948 A * | 5/1991 | Asaro | ..................... | A47B 96/16 211/104 |
| 5,413,297 A | 5/1995 | Adams | | |
| D411,436 S * | 6/1999 | Krehel | ......................... | D8/367 |
| 6,494,411 B1 * | 12/2002 | Bjorklund | ................ | F16L 3/24 248/69 |
| 6,575,416 B1 | 6/2003 | Avinger | | |
| 6,993,847 B2 * | 2/2006 | Melton | ............... | B26B 19/3826 30/216 |
| 7,992,833 B1 | 8/2011 | Goodman | | |
| D686,489 S * | 7/2013 | Adams | .......................... | D8/367 |
| D714,626 S * | 10/2014 | Trifari, Jr. | ...................... | D8/382 |
| 9,736,992 B1 * | 8/2017 | Barry | ....................... | A01G 5/04 |
| 9,801,479 B2 * | 10/2017 | Belt | ....................... | A47G 7/045 |
| 9,872,580 B1 * | 1/2018 | Roddy | .................... | F16B 45/00 |
| 10,070,745 B2 * | 9/2018 | Blevins | ............... | A47G 25/1471 |
| 10,299,614 B2 * | 5/2019 | Adams | ....................... | G09F 7/18 |
| D850,244 S * | 6/2019 | Goodman | ....................... | D8/367 |

(Continued)

*Primary Examiner* — Monica E Millner
(74) *Attorney, Agent, or Firm* — Kenneth Altshuler (57) ABSTRACT

Disclosed is a channel hanger that is generally made up of a U-shaped hook that extends from an upper half of a channel member, the channel member configured to conform to the top of a rafter. The channel hanger further includes a center channel member having a first and second leg extending from either side of the center channel member. The center channel member is in the upper half and the distal ends of the legs are in the lower half of the channel member. The channel hanger also includes a web that bridges a convex region of the U-shaped hook with the first leg. The web extends into the lower half.

18 Claims, 6 Drawing Sheets

(56) References Cited

U.S. PATENT DOCUMENTS

| | | |
|---|---|---|
| D871,897 S | 1/2020 | Wellington et al. |
| 11,440,754 B2 * | 9/2022 | Bunker, II .............. F16B 45/00 |
| 11,759,663 B1 * | 9/2023 | Truesdell ................ F16B 45/00 |
| | | 24/455 |
| 11,760,400 B2 * | 9/2023 | Colling .................... B62B 3/10 |
| | | 280/47.35 |
| 11,953,048 B1 * | 4/2024 | Hart ........................ F16B 45/00 |

* cited by examiner

RAFTER HANGER

CROSS-REFERENCE TO RELATED APPLICATIONS

This application claims priority to and the benefit of U.S. patent application Ser. No. 18/095,623 entitled: Rafter Hanger, filed on Jan. 11, 2023.

FIELD OF THE INVENTION

The present invention relates generally to utility hangers.

BACKGROUND

The accumulation of material goods is a ubiquitous problem in the modern world today. In an effort to manage and organize storage space, especially in garages, the usage of storage items, such as racks, bins, shelves, etc. are a staple. Though these storage items are an improvement over stacking material goods on the floor, there is still opportunity to better utilize storage space. It is to improvements in storage space management that embodiments of the present invention are generally directed.

SUMMARY

The present invention is generally directed to managing storage space with utility hangers.

Certain embodiments of the present invention can therefore include a rafter hanger comprising a channel member defined by a first leg that extends from a first center channel member end of a center channel member to a first leg distal end and a second leg that extends from a second center channel member end of the center channel member to a second leg distal end. The center channel member is oriented in an upward direction and the distal ends is oriented in a downward direction. The first leg has a first leg length defined from the first center channel member end to the first leg distal end. A U-shaped hook extends from a hook region of the first leg, wherein the hook region is defined along the first leg length within 30% of the first center channel member end. The U-shaped hook terminates at a distal hook end and points in the upward direction. The U-shaped hook resides above an upper half of the first leg length center channel member end along the first leg. The upper half includes the hook region.

Yet another embodiment of the present invention envisions a channel hanger consisting of a channel member, a U-shaped hook and a web. The U-shaped hook extends from an upper half of a channel member. The channel member being configured to conform to a rafter top. A center channel member having a first leg extending from a first center channel member end to a first leg distal end and a second leg and a second leg extending from a second center channel member end to a second leg distal end. The center channel member in the upper half and the distal ends in a lower half of the channel member. The web bridging a convex region of the U-shaped hook with the first leg. The web extends into the lower half.

Still yet another embodiment of the present invention envisions a rafter hook comprising a channel member with a channel defined by a center channel member comprising a first leg extending from a first center channel member end to a first leg distal end and a second leg and a second leg extending from a second center channel member end to a second leg distal end. The center channel member being defined in an up direction of the channel member and the distal ends being defined in a down direction of the channel member. A U-shaped hook extends from the channel member and resides only in an upper half of the channel member. The upper half includes the center channel member and only half of a) the first leg and b) the second leg in the up direction. The U-shaped hook comprises a concave region. A web that connects from the U-shaped hook to the first leg that is obverse to the hook concave region.

DETAILED DESCRIPTION

Initially, this disclosure is by way of example only, not by limitation. Thus, although the instrumentalities described herein are for the convenience of explanation, shown and described with respect to exemplary embodiments, it will be appreciated that the principles herein may be applied equally in other similar configurations involving the subject matter directed to the field of the invention. The phrases "in one embodiment", "according to one embodiment", and the like, generally mean the particular feature, structure, or characteristic following the phrase, is included in at least one embodiment of the present invention and may be included in more than one embodiment of the present invention. Importantly, such phrases do not necessarily refer to the same embodiment. If the specification states a component or feature "may", "can", "could", or "might" be included or have a characteristic, that particular component or feature is not required to be included or have the characteristic. As used herein, the terms "having", "have", "including" and "include" are considered open language and are synonymous with the term "comprising". Furthermore, as used herein, the term "essentially" is meant to stress that a characteristic of something is to be interpreted within acceptable tolerance margins known to those skilled in the art in keeping with typical normal world tolerance, which is analogous with "more or less." For example, essentially flat, essentially straight, essentially on time, etc. all indicate that these characteristics are not capable of being perfect within the sense of their limits. Accordingly, if there is no specific +/− value assigned to "essentially", then assume essentially means to be within +/−2.5% of exact. The term "connected to" as used herein is to be interpreted as a first element physically linked or attached to a second element and not as a "means for attaching" as in a "means plus function". In fact, unless a term expressly uses "means for" followed by the gerund form of a verb, that term shall not be interpreted under 35 U.S.C. § 112(f). In what follows, similar or identical structures may be identified using identical callouts.

With respect to the drawings, it is noted that the figures are not necessarily drawn to scale and are diagrammatic in nature to illustrate features of interest. Descriptive terminology such as, for example, upper/lower, top/bottom, horizontal/vertical, left/right and the like, may be adopted with respect to the various views or conventions provided in the figures as generally understood by an onlooker for purposes of enhancing the reader's understanding and is in no way intended to be limiting. All embodiments described herein are submitted to be operational irrespective of any overall physical orientation unless specifically described otherwise, such as elements that rely on gravity to operate, for example.

Some aspects of the present invention are directed to a channel hanger that is generally made up of a U-shaped hook that extends from an upper half of a channel member, the channel member configured to conform to the top of a rafter. The channel hanger further includes a center channel member having a first and second leg extending from either side of the center channel member. The center channel member is in the upper half and the distal ends of the legs are in the lower half of the channel member. The channel hanger also includes a web that bridges a convex region of the U-shaped hook with the first leg. The web extends into the lower half.

Figure 1A:
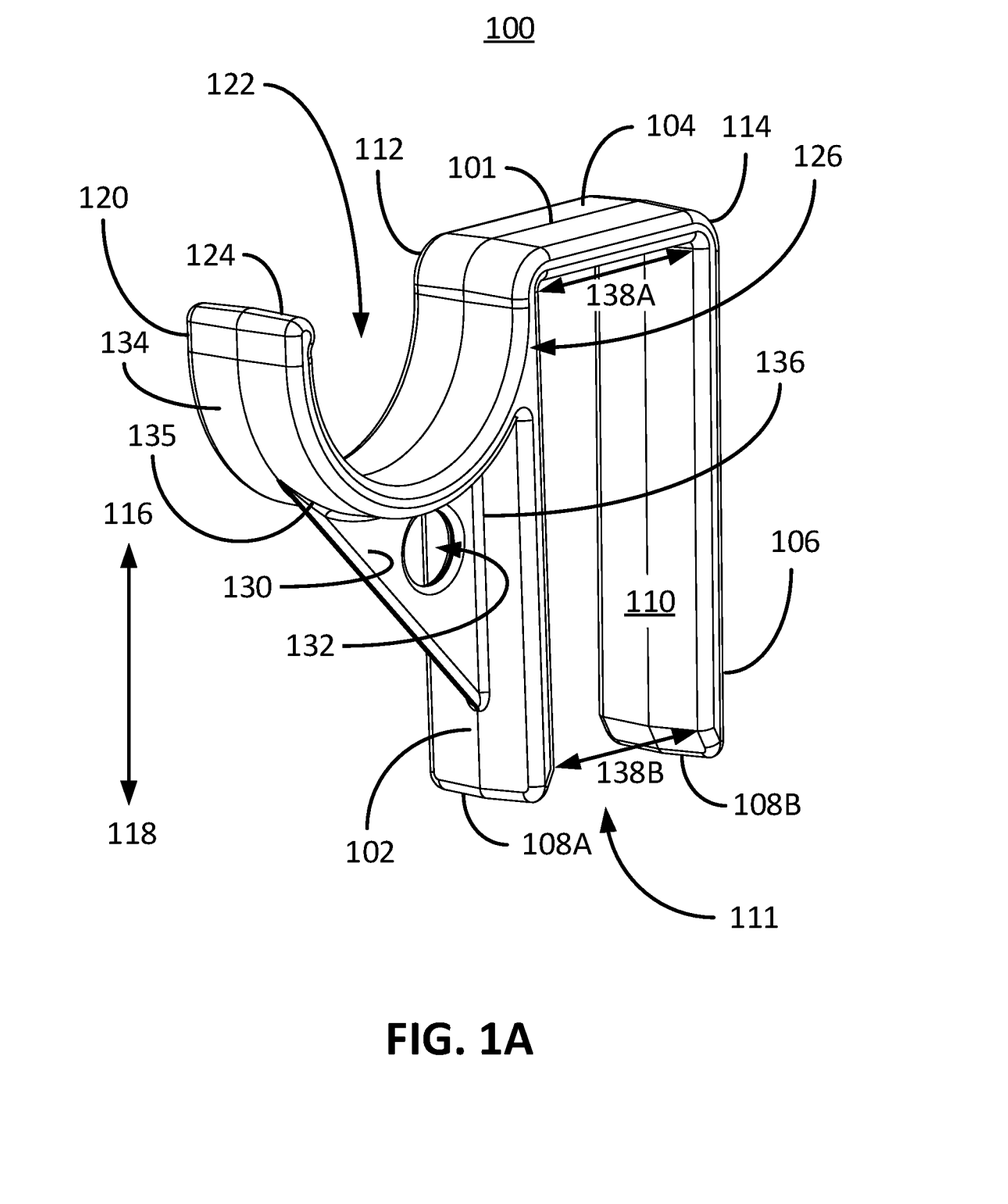
FIGS. 1A and 1B are line drawings depicting an embodiment of a rafter hanger consistent with embodiments of the present invention.
Figure 1B:
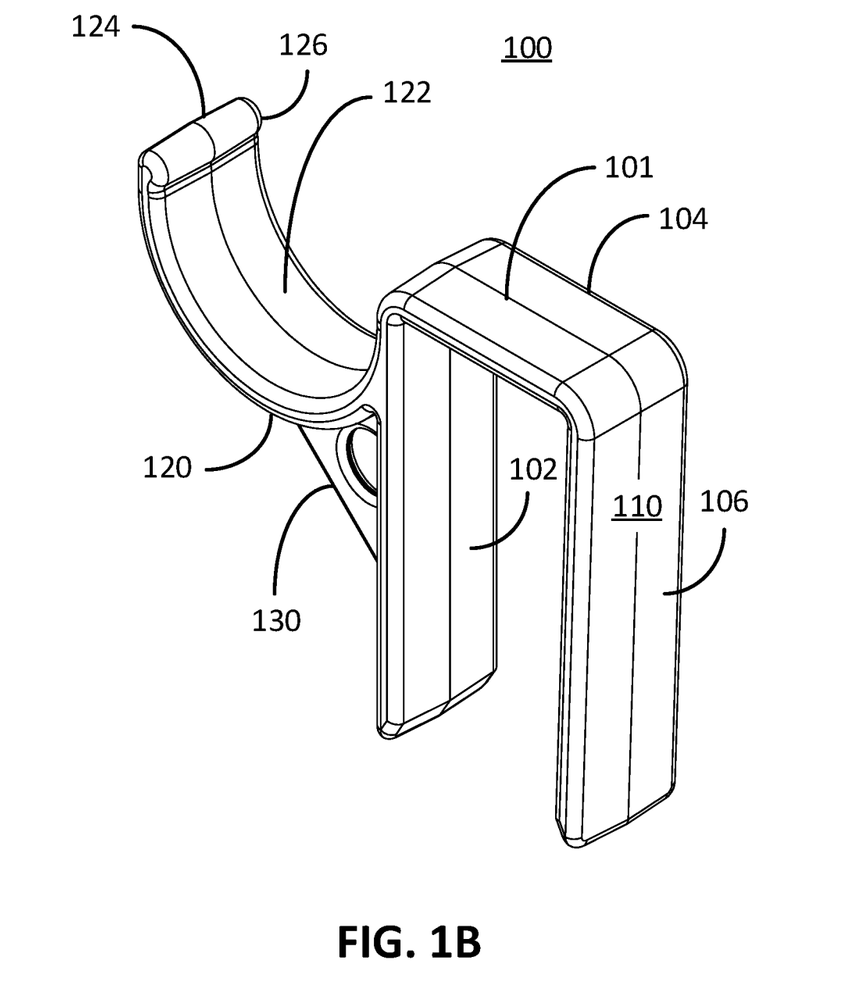
Figure 3:
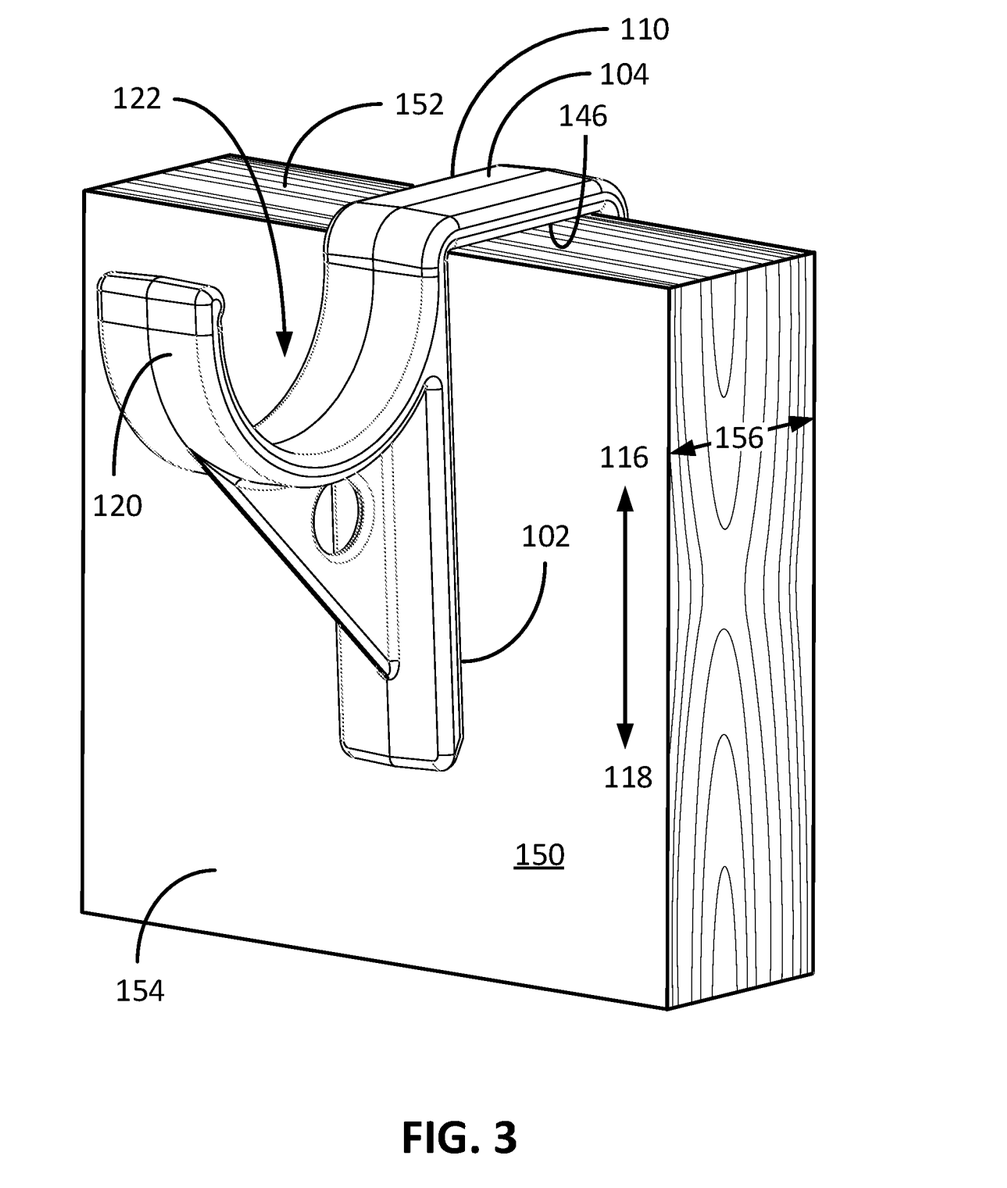
FIG. 3 illustratively depicts a line drawing of the rafter hanger embodiment engaged with a rafter consistent with embodiments of the present invention.

FIGS. 1A and 1B are line drawings depicting an embodiment of a rafter hanger consistent with embodiments of the present invention. With reference to FIG. 1A, shown therein is front ¾ view drawing of the rafter hanger embodiment 100 with a U-shaped hook 120 extending towards the viewer. The rafter hanger 100 generally comprises a channel member 110, which is the down facing "U" member with the U-shaped hook 120 facing upwards to accommodate hanging items from the U-shaped hook 120. The term hang as used herein means to dangle or rest on the U-shaped hook 120 by way of gravity. The channel member 110 is shaped and configured to slide over and closely conform to the top of a rafter 150, as shown in FIG. 3, such as a rafter 150 in a garage, for example. The channel member 110 closely conforming to the top of a rafter 150 is defined herein as having a spacing between the legs 102/106 being within 0.25 inch spacing from the rafter thickness 156 (i.e., the legs 102/106 have a spacing between 0-0.25 inch from the rafter sides 154) but preferably within 0.125 inch. A typical rafter is a 2×6, 2×8, 2×10 or 2×12, however other rafter dimensions are envisioned within the scope and spirit of the present invention. It should be noted that the true measurements of a 2×4 are 1½"×3½" (that is 1½" width, or thickness, and 3½" height), a 2×6 are 1½"×5½" and a 2×8 are 1½"×7¼", for example. The channel member 110 is defined by a center channel member 104 that has a first leg 102 and a second leg 106 extending in a downward direction 118, or just downward 118, on either end 112/114 of the center channel member 104. Each leg 102/106 extends from the center channel member 104 to a respective distal end 108A and 108B. For reference, the center channel member 104 is oriented in an upward direction 116, or just upwards 116, and the distal ends 108A and 108B are oriented in the downward direction 118, relatively. The distal ends 108 comprise a tapered lead-in tip that improves sliding the channel member 110 over a rafter 150.

The U-shaped hook 120 extends from a hook region 125 of the first leg 102 as shown. As further shown in FIG. 3, the hook region 125 is defined along the first leg length 126 but within 30% of the first center channel member end 112. The U-shaped hook 120 comprises a concave hook region 122 that receives items intended to be supported by the U-shaped hook 120. Examples of items that might hang from the U-shaped hook 120 include a bicycle wheel, a bicycle hanging by a wheel, or some other item. The U-shaped hook 120 terminates at a distal hook end 124 that points in the upward direction 116. Here, the U-shaped hook 120 resides above an upper half 128 of the first leg length 126, which includes the hook region 125. The U-shaped hook 120 is in-line with the channel member 110. That is, the first leg 102 is in-line and in between the distal hook end 124 and the second leg 106.

In the present rafter hanger embodiment 100, the channel member 110 and the U-shaped hook 120 all share a common centerline 101. The first leg 102, the second leg 106, the center channel member 104 and the U-shaped hook 120 all have the same hanger width 140 and hanger thickness 142. In the present embodiment, the hanger width 140 is at least two times greater than the hanger thickness 142. Other embodiments contemplate a U-shaped hook 120 being angled away from the centerline 101 of the channel member 110. In the angled away embodiment, the U-shaped hook 120 can optionally include webs and supports that connect to the channel member 110 for added stiffness and structural integrity.

A web 130 extends from a lower half 129 of the first leg 102 to the U-shaped hook 120, wherein the web 130 is joined to the first leg 102 and to the convex side 134 of the U-shaped hook 120 at locations 135 and 136, respectively. The web 130 provides rigidity to the U-shaped hook 120 because it has a high secondary moment of inertia along the common centerline 101. Accordingly, the web width 144 can be relatively thin compared to the hanger thickness 142 to resist downward bending moments on the U-shaped hook 120. In certain embodiments, the hanger width 140 can be at least 5 times thicker than the web width 144. The web 130 comprises at least one accessory hook aperture 132 that can accommodate a strap or hook (not shown). In the present embodiment the rafter hanger 100 is a unitary piece of material, such as a polymer, composite polymer, metal or some other suitable material known to those skilled in the art. The rafter hanger 100 can be molded. Optionally the channel member 110 and the U-shaped hook 120 can be extruded and then diced into hanger widths 140 with the web 130 attached in a post process.

FIG. 1B is drawing depicting the rafter hanger embodiment 100 in a rear perspective ¾ view with a U-shaped hook 120 extending away the viewer. As shown, the second leg 106 of the channel member 110 is facing the viewer and the U-shaped hook 120 is pointing away from the viewer with the first leg 102 in between. As better shown from this angle, a lip 125 protrudes from the distal hook end 124 towards the concave hook region 122. The lip 125 provides additional retention for items engaged with or otherwise hanging from the U-shaped hook 120. The lip 125 can also serve as a snap feature. Also, shown for reference are the centerline 101, the center channel member 104 and the web 130.

Figure 2A:
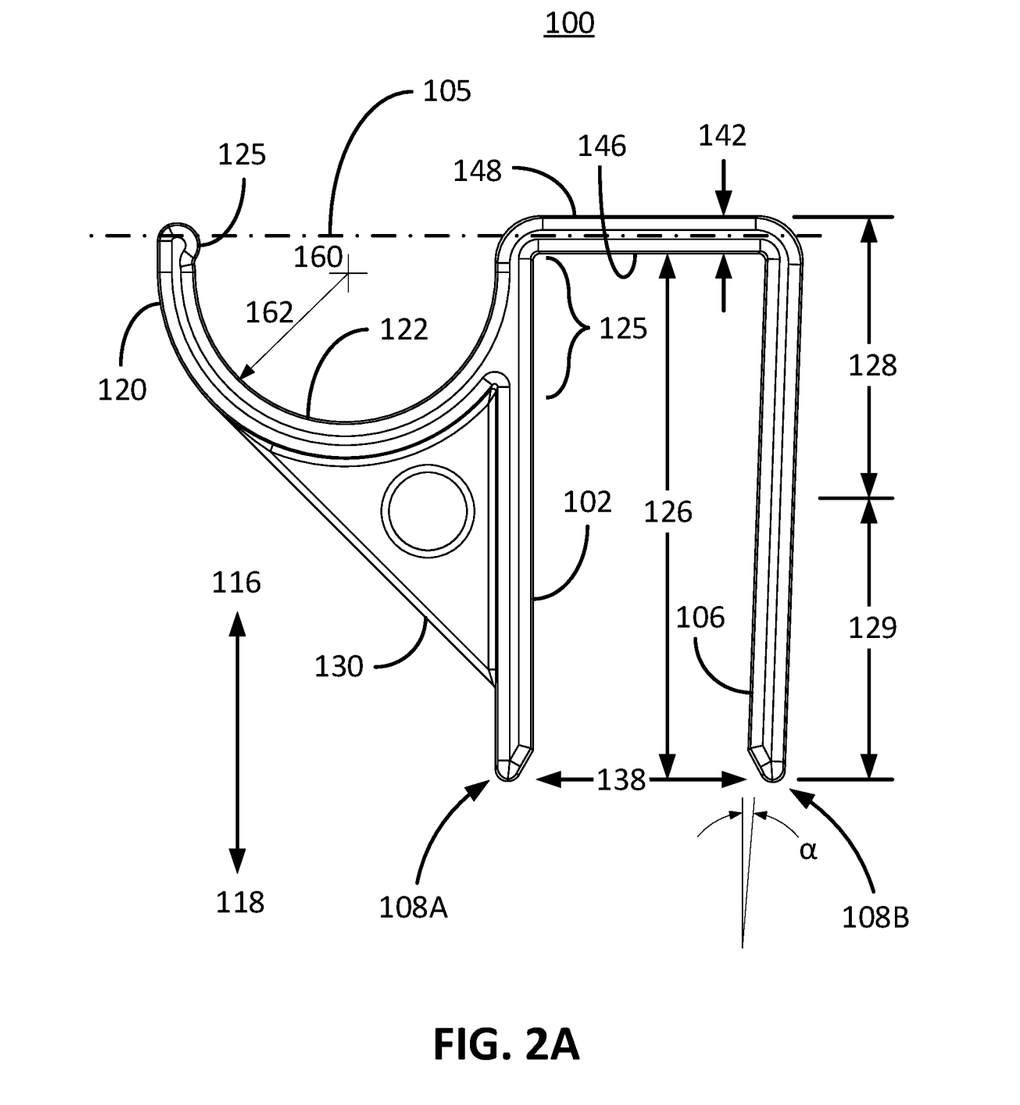
FIGS. 2A-2C are line drawings illustratively depicting the rafter hanger side, top and front consistent with embodiments of the present invention.
Figure 2B:
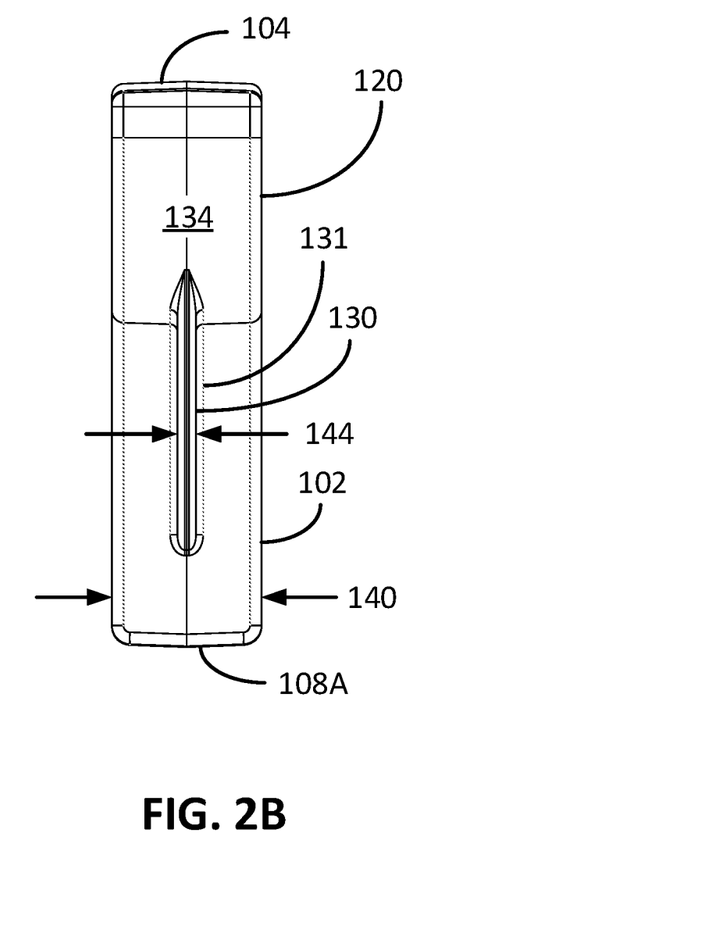
Figure 2C:
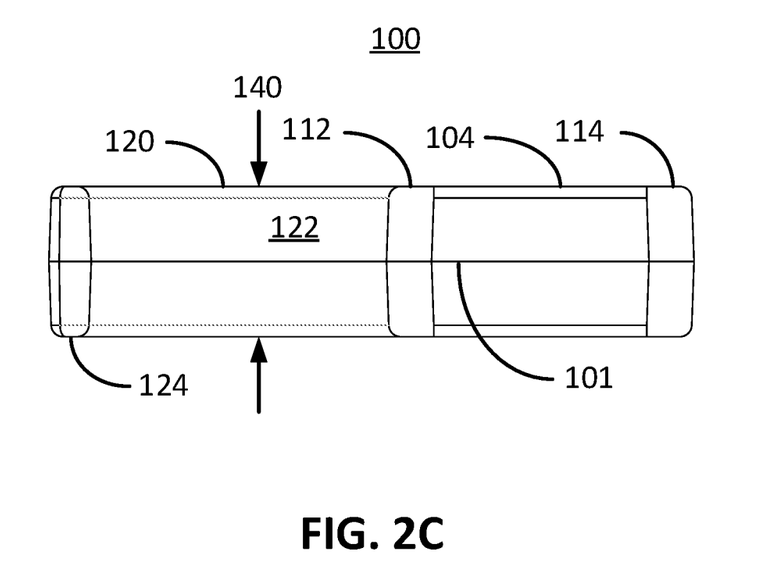

FIGS. 2A-2C are line drawings illustratively depicting the rafter hanger side, top and front consistent with embodiments of the present invention. FIG. 2A is a side view of the rafter hanger embodiment 100 showing dimensions and locations of the relative elements of the rafter hanger embodiment 100. With respect to the channel member 110, and to the rafter hanger embodiment 100 for that matter, the upper half 128 and a lower half 129 are oriented by the upward direction 116 and the downward direction 118. The leg lengths 126 are defined at the center channel member bottom side 146 to the respective leg distal ends 108A/108B. In the present embodiment, the leg separation distance 138 between the first leg 102 and the second leg 106 is greater in the upper half 128 (upper leg separation distance 138A) than the lower half 129 (lower leg separation distance 138B). In the present embodiment, the second leg 106 is angled at α towards the first leg 102. The angle α is about 5 degrees with the closest points of each leg 102/106 being the first and second leg distal ends 108A/108B. Certain other embodiments envision the angle α being between 1 degree and 10 degrees. The angled second leg 106 helps to pinch against a rafter 150, as shown in FIG. 3.

With reference to the U-shaped hook 120, a hook region 125 is defined along the leg length 126 of the first leg 102 (first leg length) within 30% along the length 126 of the first center channel member end 112. In other embodiments, the hook region 125 resides simply within the upper half 128 of the first leg 102. Here, the U-shaped hook 120 is part of the first leg 102 in that it is molded or otherwise an extension from a single piece of material that includes the first leg 102. The U-shaped hook 120 extends to the left of the channel member 110 and is supported by the web 130, which provides rigidity to the U-shaped hook 120 in the downward direction 118. In this embodiment, the U-shaped hook 120 is a semicircle with a semicircle constant radius 162, shown here extending from the semicircle's center point 160 to the concave hook region 122. The semicircle is a half-circle in this embodiment, but other embodiments envision more or less of a half circle. Still, other embodiments envision a variety of different shapes that function within the scope and spirit of the present invention, such as an elliptical shape, a semi-rectangular shape, a V-shape, etc. The U-shaped hook 120 terminates at the lip 125, wherein the lip 125 is essentially at the same level as the center channel member 104, as shown by the axis line 105. By essentially at the same level as the center channel member 104, it is meant that the lip 125 is within the hanger thickness 142 of the center channel member 104 along the axis line 105. Other embodiments envision the distal hook end 124 being more than one hanger thickness 142 above or below the center channel member 104. In one preferred embodiment, the leg length 126 is 3.3 inches long and, leg separation distance 138A is 1.55 inches, the hanger thickness 142 is 0.36-0.68 inches, the semicircle's constant radius is 1 inch, and the accessory hook aperture 132 is 0.5 inches in diameter. Of course, other embodiments envision different dimensions than this preferred embodiment.

FIG. 2B is a front view of the rafter hanger embodiment 100 showing dimensions and locations of the relative elements of the rafter hanger embodiment 100. As shown here, the hanger width 140 is constant for both the channel member 110 and the U-shaped hook 120. That is the center channel member 104, the U-shaped hook 120 and the legs 102/106 have the same hanger width 140. One embodiment envisions the hanger width 140 preferably being between 0.75 and 1.25 inches. Yet other embodiments envision the hanger width 140 being wider or narrower than the preferred width embodiment. As is further shown, the web width 144 is narrower than the hanger width 140. In a preferred web width embodiment, the web width 144 is between 0.15 inches and 0.3 inches wide. Other embodiments envision the web width 144 being more or less than the preferred web width embodiment. Also note, the web 130 comprises a web radius 131 that blends the web 130 into the first leg 102 and web convex side 134.

FIG. 2C is a top view of the rafter hanger embodiment 100 (looking down on the rafter hanger 100) showing the size and locations of the relative elements of the rafter hanger embodiment 100. As shown here, the hanger width 140 is constant for both the channel member 110 and the U-shaped hook 120. That is, the center channel member 104 and the U-shaped hook 120 have the same hanger width 140 and common centerline 101. To orient the reader, the center channel member 104 is bounded by the first and second center channel member ends 112/114, and the concave hook region 122 is shown in U-shaped hook 120 that terminates at the distal hook end 124.

FIG. 3 illustratively depicts a line drawing of the rafter hanger embodiment 100 engaged with a rafter consistent with embodiments of the present invention. As shown, the channel member 110 is engaged with a rafter 150 (this rafter being a 2×6 and made of wood). More specifically, the center channel member bottom side 146 of the center channel member 104 is resting on the rafter top surface 152, as oriented using the upward and downward directions 116/118. The upper leg separation 138A is greater than the rafter thickness 156 and the lower leg separation 138B is less than the rafter thickness 156 thereby pinching the rafter faces 154 to provide a conforming fit of the rafter hanger embodiment 100 with the rafter 150. When engaged with the rafter 150, the channel member 110 clamps around the rafter 150 and the U-shaped hook 120 extends outward from the rafter face 154 ready to receive an object to be hung therefrom or otherwise to be resting in the concave hook region 122.

With the present description in mind, below are some examples of certain embodiments illustratively complementing some of the apparatus embodiments to aid the reader. The elements called out below are examples provided to assist in the understanding of the present invention and should not be considered limiting.

In that light, certain embodiments of the present invention contemplate a rafter hanger 100 comprising a channel member 110 defined by a first leg 102 that extends from a first center channel member end 112 of a center channel member 104 to a first leg distal end 108A and a second leg 106 that extends from a second center channel member end 114 of the center channel member 104 to a second leg distal end 108B. The center channel member 104 is oriented in an upward direction 116 and the distal ends 108A and 108B is oriented in a downward direction 118. The first leg 102 has a first leg length 126 defined from the first center channel member end 112 to the first leg distal end 108A. A U-shaped hook 120 extends from a hook region 125 of the first leg 102, wherein the hook region 125 is defined along the first leg length 126 within 30% of the first center channel member end 112. The U-shaped hook 120 terminates at a distal hook end 124 and points in the upward direction 116. The U-shaped hook 120 resides above an upper half 128 of the first leg length 126 center channel member end 112 along the first leg 102. The upper half 128 includes the hook region 125.

The rafter hanger embodiment 100 can be wherein the first leg 102 comprises a width 140 and a thickness 142 that is essentially identical to the second leg 106. The U-shaped hook 120 and the center channel member 104 have the same width 140, which is at least two time greater than the thickness 142.

The rafter hanger embodiment 100 can further comprise a web 130 that extends from a lower half 129 of the first leg 102 to the U-shaped hook 120, wherein the web 130 is joined to the first leg 102 and the U-shaped hook 120. This can further be wherein the first leg 102 and the U-shaped hook 120 have a leg and hanger 140 that is at least 5 times thicker than a web width 144 of the web 130. The web 130 can further comprise an aperture 132, which can be for an accessory hook. Also, an embodiment envisions the second leg 106, the U-shaped hook 120, the center channel member 104, and the web 130 all sharing a common centerline 101.

The rafter hanger embodiment 100 is further envisioned to have the first leg 102 at the center channel member 104 being separated from the second leg 106 at the center channel member 104 at a first distance 138A and the first leg distal end 108A is from the second leg distal end 108B at a second distance 138B, the first distance 138A is longer than the second distance 138B.

The rafter hanger embodiment 100 contemplates that the center channel member 104, the first leg 102 and the second leg 106 define a channel 111 that is configured to conform to and slidingly engage a 1.5 inches thick rafter 150 at a rafter top 152 of the rafter 150.

The rafter hanger embodiment 100 envisions the first leg 102 being in-line and in between the distal hook end 124 and the second leg 106. In addition, the distal hook end 124 is essentially coplanar with a top surface 148 of the center channel member 104. That is, the distal hook end 124 is within +/− the hanger thickness 142 of the top surface 148, which in one embodiment is +/−0.35 inches.

Yet another embodiment of the present invention envisions a rafter hook 100 comprising a channel member 110 with a channel 111 defined by a center channel member 104 comprising a first leg 102 extending from a first center channel member end 112 to a first leg distal end 108A and a second leg 106 and a second leg 106 extending from a second center channel member end 114 to a second leg distal end 108A. The center channel member 104 being defined in an up direction 116 of the channel member 110 and the distal ends 112 and 114 being defined in a down direction 118 of the channel member 110. A U-shaped hook 120 extends from the channel member 110 and resides only in an upper half of the channel member 110. The upper half includes the center channel member 104 and only half of a) the first leg 102 and b) the second leg 106 in the up direction 116, meaning only half of the first leg 102 and half of the second leg 106. The U-shaped hook 120 comprises a concave region 122. A web 130 that connects from the U-shaped hook 120 to the first leg 102 that is obverse to the hook concave region 122.

The rafter hook embodiment 100 further envisions the U-shaped hook 120 extending from a hook region 125 of the first leg 102. The hook region 125 is defined along the first leg length 126 within 25% of the first center channel member end 112, the U-shaped hook 120 terminating at a distal hook end 124 pointing in the up direction 116.

The rafter hook embodiment 100 contemplates at least 75% of the U-shaped hook 120 is circular.

The rafter hook embodiment 100 further envisions the first leg 102 being in-line and in between the distal hook end 124 and the second leg 106. The distal hook end 124 can be essentially coplanar with a top surface 148 of the center channel member 104.

The rafter hook embodiment 100 further envisions the web 130 extending from a lower half of the first leg 102 to the U-shaped hook 120.

The rafter hook embodiment 100 imagines the first leg 102 and the U-shaped hook 120 having a thickness that is a least 5 times thicker (greater) than the web width 144. The web 130 can further comprise a circular aperture 132 that in some of the embodiments can be between 0.3 and 0.8 inches in diameter.

The rafter hook embodiment 100 further imagines the first leg 102 being separated from the second leg 106 by between 1.25 and 1.6 inches.

The rafter hook embodiment 100 further imagines the first leg being separated from the second leg by between 1.25 and 1.6 inches, the first leg and the second leg being between 3 and 4 inches long, the U-shaped hook being a semicircle with a radius between 0.75 and 1.25 inches, the channel member and the U-shaped hook comprising a hanger width that is between 0.75 and 1.25 inches, and the U-shaped hook and channel member having a hanger thickness is 0.36-0.68 inches.

Still another embodiment of the present invention envisions a channel hanger 100 consisting of a channel member 110, a U-shaped hook 120 and a web 130. The U-shaped hook 120 extends from an upper half of a channel member 110. The channel member being configured to conform to a rafter top 150. A center channel member 104 having a first leg 102 extending from a first center channel member end 112 to a first leg distal end 108A and a second leg 106 and a second leg 106 extending from a second center channel member end 114 to a second leg distal end 108A. The center channel member 104 in the upper half 128 and the distal ends 108 in a lower half 129 of the channel member 110. The web 130 bridging a convex region 134 of the U-shaped hook 120 with the first leg 102. The web 130 extends into the lower half 129.

Optionally, the channel hanger 100 can further be defined with the first leg being separated from the second leg by between 1.25 and 1.6 inches, the first leg and the second leg being between 3 and 4 inches long, the U-shaped hook being a semicircle with a radius between 0.75 and 1.25 inches, the channel member and the U-shaped hook having a hanger width that is between 0.75 and 1.25 inches, and the web being between 0.15 inches and 0.3 inches wide.

The above sample embodiments should not be considered limiting to the scope of the invention whatsoever because many more embodiments and variations of embodiments are easily conceived within the teachings, scope and spirit of the instant specification.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms used herein. For example, though embodiments of the present invention describe the fundamental elements of a rafter hanger 100, certain elements can be altered, such as dimensions, without departing from the scope and spirit of the present invention. It should also be appreciated that there may be aspects of the mechanical elements not discussed in detail in the present disclosure that must be implemented in accordance known to those skilled in the art. The specification and drawings are to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms and "consisting" is considered a closed term.

It will be clear that the claimed invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the claimed invention disclosed and as defined in the appended claims. Accordingly, it is to be understood that even though numerous characteristics and advantages of various aspects have been set forth in the foregoing description, together with details of the structure and function, this disclosure is illustrative only, and changes may be made in detail, especially in matters of structure and arrangement to the full extent indicated by the broad general meaning of the terms in which the appended claims are expressed.

What is claimed is:

1. A rafter hanger comprising:
a U-shaped hook extending from an upper half of a channel member, the channel member comprising a center channel element configured to conform to a rafter top;
the channel member further comprising a first leg extending from a first element end of the center channel element to a first leg distal end and a second leg extending from a second element end of the center channel element to a second leg distal end,
the first and the second leg distal ends are confined to a lower half of the channel member, wherein the center channel element is confined to the upper half;
a web bridging a convex region of the U-shaped hook with the first leg, the web extending into the lower half
wherein the distal hook end is essentially coplanar with a top surface of the center channel element.

2. The rafter hanger of claim 1, wherein the first leg comprises a width and a thickness that is essentially identical to the second leg, the U-shaped hook and the center channel element, the thickness that is at least two time greater than the width.

3. The rafter hanger of claim 1, wherein the first leg and the U-shaped hook are at least 5 times thicker than a web width of the web.

4. The rafter hanger of claim 1, wherein the web comprises an aperture.

5. The rafter hanger of claim 1, wherein the first leg, the second leg, the U-shaped hook, the center channel element, and the web share a common centerline.

6. The rafter hanger of claim 1, wherein the first leg is a different length than the second leg.

7. The rafter hanger of claim 1, wherein the center channel element, the first leg and the second leg define a channel that is configured to conform to and slidingly engage a 1.5 inch thick rafter at the rafter top.

8. The rafter hanger of claim 1, wherein the U-shaped hook is a semi-circle that dips below the center channel element turning in a downward direction towards the first leg distal end before turning in an upward direction to the distal hook end.

9. A rafter hanger comprising:
a U-shaped hook extending from an upper half of a channel member, the channel member is configured to conform to a rafter top;
the channel member further comprising a center channel element defined between a first and a second element end;
a first leg extending from the first element end to a first leg distal end and a second leg extending from the second element end to a second leg distal end,
wherein the center channel member is in the upper half and the first and second leg distal ends are in a lower half of the channel member; and
a web bridging a convex region of the U-shaped hook with the first leg, the web extending into a lower half of the channel member.

10. The rafter hanger of claim 1 further comprising a web that extends from the lower half of the channel member to the U-shaped hook, wherein the web is joined to the first leg and the U-shaped hook.

11. The rafter hanger of claim 10, wherein the first leg and the U-shaped hook are at least 5 times thicker than a web width of the web.

12. The rafter hanger of claim 10, wherein the web comprises an aperture.

13. The rafter hanger of claim 10, wherein the first leg, the second leg, the U-shaped hook, the center channel element, and the web share a common centerline.

14. A rafter hanger comprising:
a channel member having a first and a second leg extending from either end of a center channel member, the first leg having a first leg length defined from the center channel member to a first distal end of the first leg;
a U-shaped hook extending from the channel member nearest to the first leg,
the U-shaped hook residing in an upper half of the first leg in an upper half of first leg length, which is defined as a portion of the first leg length that is closest to the channel member,
the channel member is configured to conform to a rafter top; and
a web bridging a convex region of the U-shaped hook with the first leg, the web extending into a lower half of the channel member.

15. The rafter hook of claim 14, wherein the U-shaped hook extends from a hook region of the first leg, the hook region is defined along the first leg length within 25% of the center channel member, the U-shaped hook terminating at a distal hook end pointing in an upward direction, wherein the center channel member defines an upward direction for the rafter hanger and first distal end defines a downward direction for the rafter hanger.

16. The rafter hook of claim 14, wherein the first leg is in-line and in between a distal hook end of the U-shaped hook and the second leg.

17. The rafter hook of claim 14, wherein at least 75% of the U-shaped hook is circular.

18. The rafter hanger of claim 14, wherein the web comprises an aperture.

* * * * *